Oct. 14, 1969  H. E. G. ARNESON  3,472,565
EXTERNALLY PRESSURIZED BEARING STRUCTURE
Filed Sept. 5, 1967  3 Sheets-Sheet 1

INVENTOR.
HAROLD E. G. ARNESON
BY
Richard Gregory
ATTORNEYS

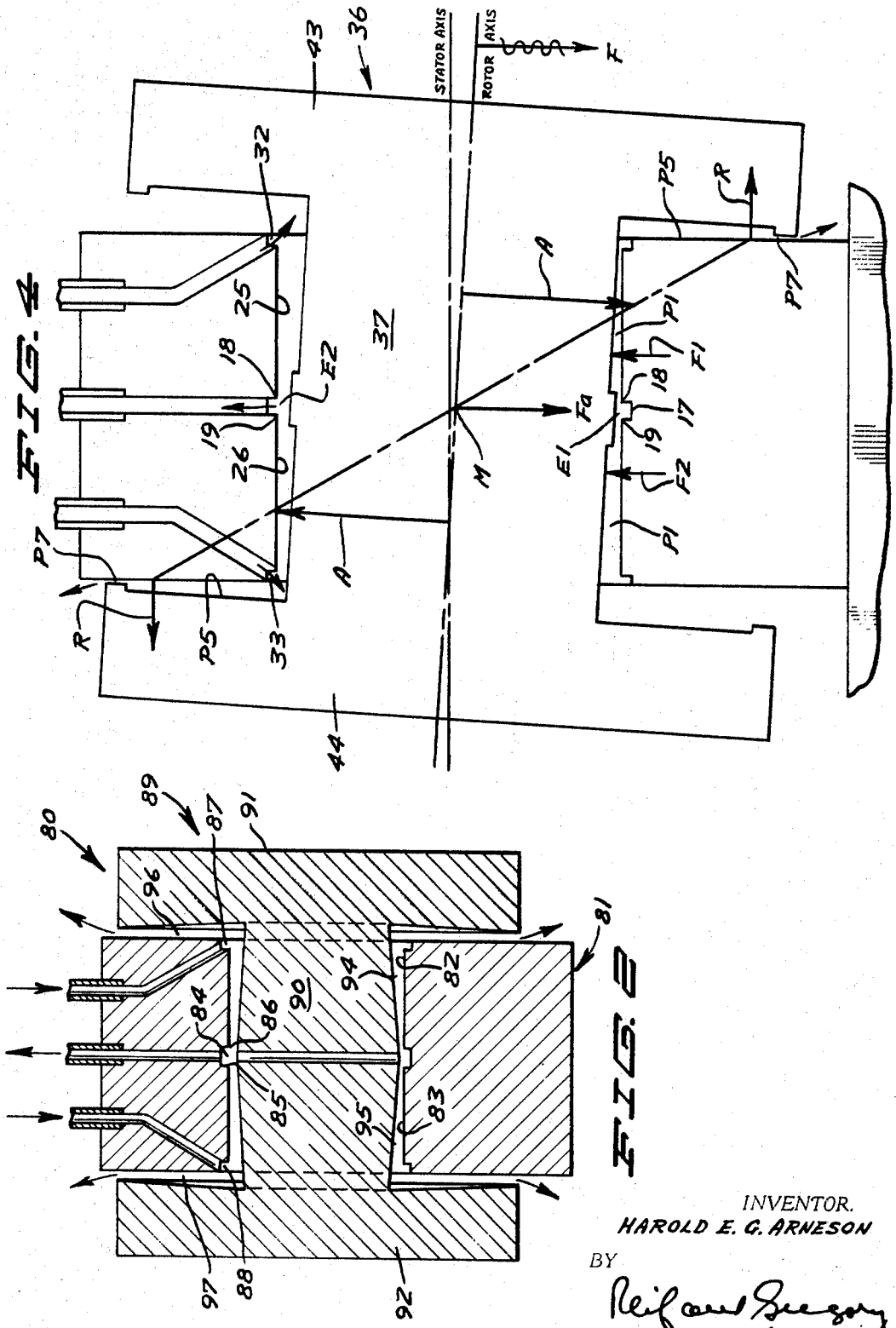

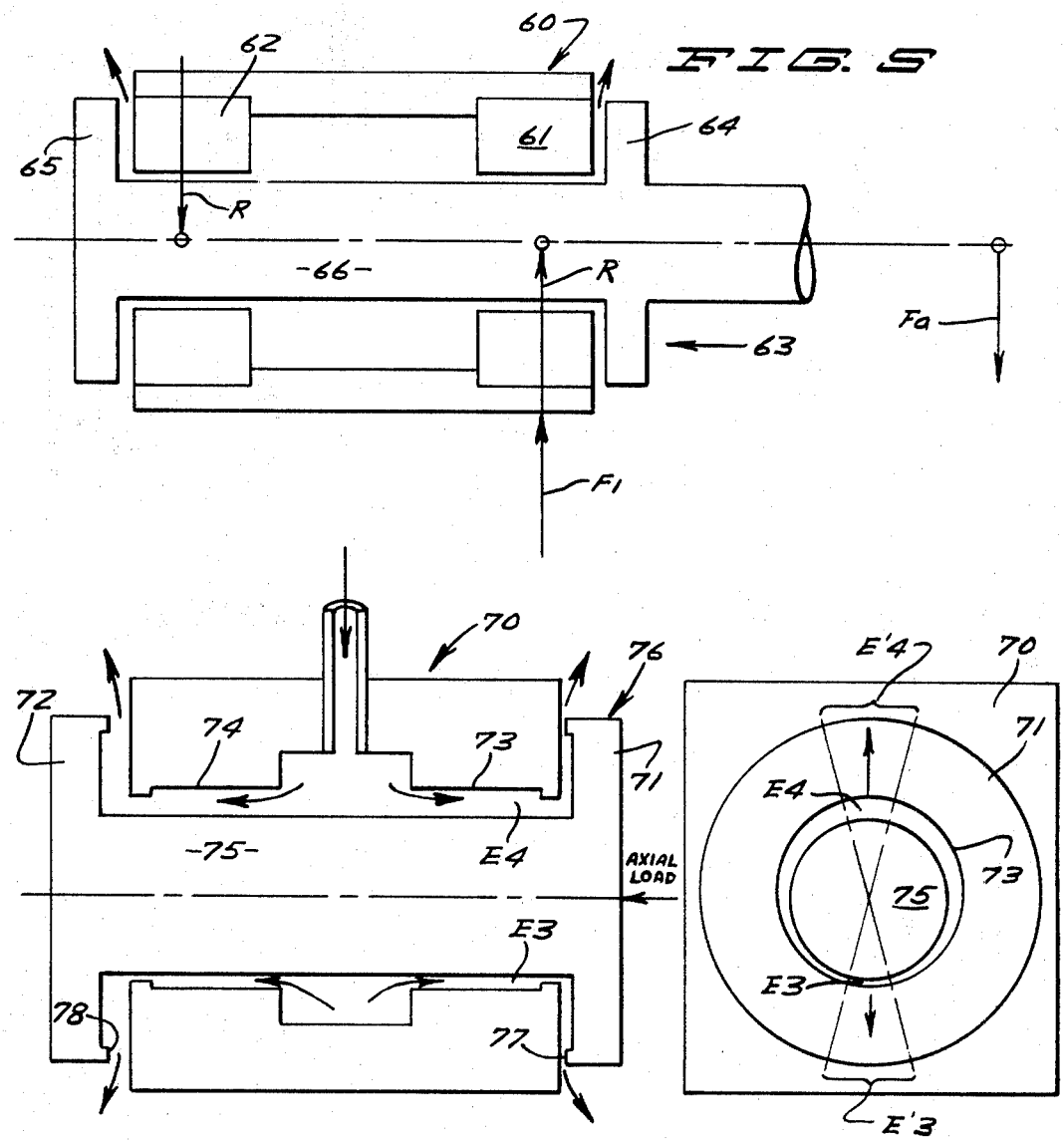

United States Patent Office 3,472,565
Patented Oct. 14, 1969

3,472,565
EXTERNALLY PRESSURIZED BEARING STRUCTURE
Harold E. G. Arneson, 2322 W. Lake of the Isles Blvd., Minneapolis, Minn. 55405
Filed Sept. 5, 1967, Ser. No. 66,242
Int. Cl. F16c 7/04, 35/00, 1/24
U.S. Cl. 308—9                                         9 Claims

ABSTRACT OF THE DISCLOSURE

An externally pressurized bearing structure comprising combined radial and thrust bearings, a relatively short shaft journaled within said radial bearings, thrust plates at either end of said shaft, exhaust means centrally of said radial bearings and supply passages adjacent the remote ends of said radial bearings to provide full line pressure to both the radial and thrust bearings.

BACKGROUND AND SUMMARY OF INVENTION

The invention herein relates to improvement in an externally pressurized combined radial and thrust bearing structure and more particularly with respect to spindle type bearing structures. In such bearing structures the thrust bearing can provide little or no resistance to outboard or tilting loads and consequently the radial bearings must provide the restoring couple. In addition, assuming there are to be two radial bearings, which is a common structure, and with respect to an outboard or tilting load, the force applied is amplified at the front bearing, the radial bearings do not act in the same direction in generating an opposing force, and consequently, the rear bearing negatives some of the restoring force generated at the front bearing.

An essential contribution and an object of the invention herein is to provide structure within which the radial bearings act in the same direction in generating a restoring force to fully support one another and the thrust bearings in connection therewith bear not only the thrust load but also the entire moment load.

An essential advantage gained with the use of structure embodying the invention herein is a relatively greater load bearing capacity than would be attained otherwise.

It is an object of this invention to provide thrust bearings generating relatively rigid support for a freely rotating shaft.

It is another object of this invention to provide full line pressure of fluid to both the radial and thrust bearing portions of the structure.

It is also an object of this invention with respect to the structure indicated to provide thrust plates respectively having a diameter with respect to their clearance spaces such as to limit the angle through which the rotor can tilt to an angle which is on the order of or preferably less than that which would be determined by the length of the shaft relative to its clearance space.

It is a further object herein to provide radial bearings having closely spaced exhaust perimeters.

It is also an object herein to provide a bearing structure embodying the use of a relatively short shaft.

These and other objects and advantages of the invention will be set forth in the following description made in connection with the accompanying drawings in which like reference characters refer to similar parts throughout the several views and in which:

FIGS. 2 and 3 are views similar to that in FIG. 1 showing modifications thereof;

FIG. 4 is a schematic view embodying a force diagram representing the structure of the invention herein and illustrating the operative effect thereof;

FIGS. 5–7 are schematic views of structure representing generally used related bearing structures for comparison with the effect of the structure represented in FIG. 4. FIG. 7 represents a view taken in a plane normal to the axis of the rotor in FIG. 6.

DESCRIPTION OF A PREFERRED EMBODIMENT

Figure 1:
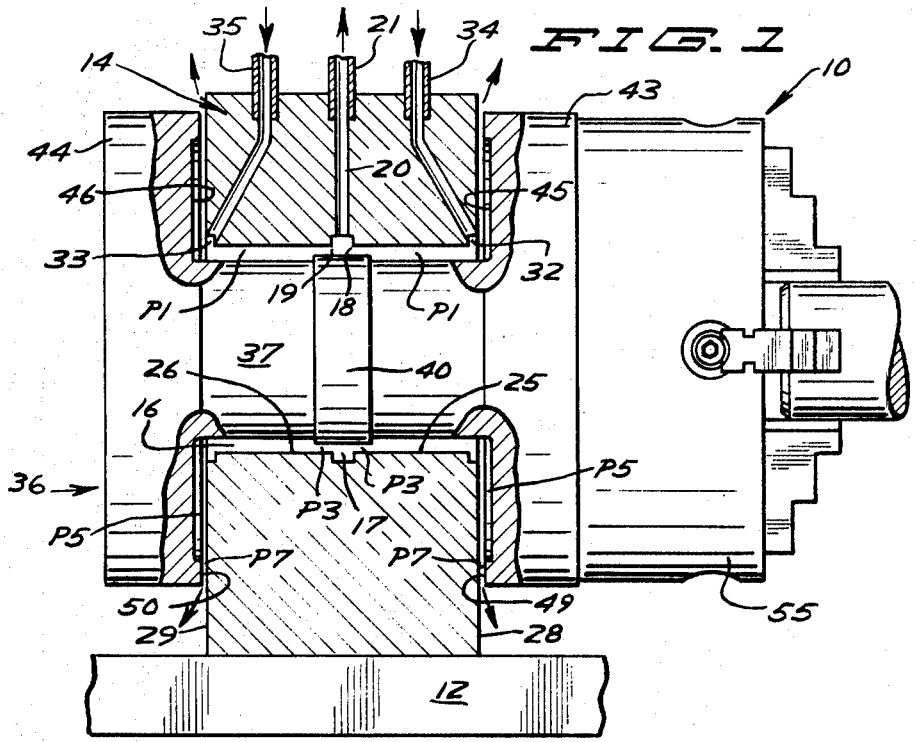
FIG. 1 is essentially a diagrammatic view in elevation of structure embodying the invention herein with some portions being broken away and some portions being shown in section.

The bearing structures shown and described herein are characterized generally by the term headstock. The embodiment in FIG. 1 is indicated generally by the reference numeral 10.

Suitably secured to a base or supporting member 12 is a body portion or stator 14 which may take on various configurations in outer form and is here indicated as being rectangular in vertical cross section and of relatively short length. Extending transversely through said stator is a cylindrical bore 16.

The bearing structure herein has as novel elements, exhaust means substantially centrally longitudinally of said bore, said exhaust means having closely spaced perimeters defined by adjacent ends of radial bearings and supply passages adjacent the respective end portions or perimeters of said bore. Said exhaust means may comprise one or more exhaust passages.

Shown in connection with the embodiment herein, centrally of said bore and formed within the surface portion thereof is an exhaust means 17 which forms an annular groove or exhaust passage. Said annular groove is shown having an outlet passage 20 leading outwardly therefrom and terminating in an external outlet 21. Said annular groove or exhaust passage 17 is relatively narrow and has closely spaced exhaust perimeters 18 and 19.

At either side of said exhaust passage 17 within said bore and comprising surface portions thereof are radial bearings 25 and 26. Said bearings are respectively indicated as being front and rear bearings. Though shown of equal length, it is within the concept herein to have said bearings of unequal length. The adjacent ends of said bearings define said exhaust perimeters 18 and 19.

Formed at each perimeter of said bore and recessed within the end walls 28 and 29 of said stator are relatively shallow unrestricted annular supply grooves or passages 32 and 33. These passages will supply fluid under full line pressure directly to both the radial bearings and the thrust bearings of the structure herein.

Leading to said passages 32 and 33 are supply lines 34 and 35 which are here shown extending through the body of said stator and running therefrom to a suitable pressurized supply of fluid, such as air.

Carried by said stator and journaled within said bore is a rotor 36 comprising a shaft 37. Said shaft with respect to each of the bearings 25 and 26 will have a radial clearance of such restriction with respect to the respective lengths of said bearing that the body forces acting on the fluid flowing therethrough are negligible and the viscous forces predominate. This condition prevails with the bearings each having a length at least 500 times its clearance. The clearance between the shaft and each of said bearings forms primary passages P1.

Centrally about said shaft is a further restrictive means 40 with respect to said radial clearance or passages P1 and is shown as a raised step or land forming exhaust passages P3 with respect to the exhaust passage 17 and more particularly with respect to the perimeters 18 and 19 thereof. The lengths of said passages P3 at either side of the perimeters of said outlet passage 17 should be at least twenty times the radial clearance at said perimeters between said step and said bore.

Carried at either end of said shaft 37 and secured thereto in a conventional manner are thrust plates 43 and 44. The inner faces 45 and 46 of said thrust plates respectively will be spaced from the adjacent facing surfaces of the end walls 28 and 29 of said stator 14 to provide restrictive clearance forming thrust passages P5 therebetween. Said thrust plates with respect to the adjacent surfaces of said end walls will be referred to as bearings.

Restrictive means 49 and 50 shown here as raised annular steps or lands respectively about the perimeters of said inner thrust faces 45 and 46 form exhaust passages P7 which form a further restriction of the passages P5.

The clearance spaces of said passages P5 and P7 may correspond to those present in passages P1 and P3.

Said thrust plates will have diameters preferably greater than the length of said shaft 37 and preferably will have such a length as to limit the angle of tilt of said rotor 36 to less than the angle of tilt which would be determined by the length of the shaft 37 and its clearance space within said bore. Thus the diameters of said thrust plates relate to both the length of said shaft and to the respective clearances of the shaft and of the thrust plates. This is a preferable working condition but is not to be regarded as a limitation on the length of the thrust plate diameters.

A conventional work or tool holding means 55 is shown secured to said thrust plate 43. Said thrust plate may be adapted to have said holding means 55 bolted or screwed thereto.

Bearing clearances have been magnified throughout the drawings for purpose of illustration.

OPERATION

The bearing structure of the invention herein achieves relatively greater bearing stiffness and consequently a greater load bearing capacity than could otherwise be had.

In a conventional type of externally pressurized combined radial and thrust bearing structure such as a spindle bearing, the pressurized fluid is supplied under line pressure to the radial bearings and after a pressure drop due to the restrictions in the clearance space of the radial bearings, the fluid passes with diminished pressure into the thrust bearings. Hence the thrust bearings receive only a distributive or residual share of the available pressure drop with respect to the line pressure. This arrangement is a series relationship.

In the structure embodying the invention herein, full line pressure is supplied independently through the passages 32 and 33 to both the radial and thrust bearings. Consequently the maximum load capacity attainable for a given line pressure is achieved. This relationship between the radial and thrust bearings is a parallel relationship.

Reference is had to FIG. 4 which embodies a force diagram to show the operative effect of the bearing structure above described and of the cooperative relationship between the radial bearings 25 and 26 and between said radial bearings and said thrust bearings 43 and 44.

The work load F applied to the bearing structure, for purpose of illustration, is diagrammatically shown replaced by a couple A—A and a force Fa acting through the midpoint M of the axis of the shaft 37. This outboard type of loading commonly occurs in the case of a lathe or lathe headstock for which application the structure herein is well suited.

The applied couple A—A tends to cause a tilt of the rotor 36 or a rotation of the rotor about an axis normal to the plane of the applied couple through said midpoint M. This is indicated by the "Rotor Axis" reference line with respect to the "Stator Axis." A restoring couple R—R is generated by increased pressures in the regions of decreased clearance of the passages P5 and P7 of the thrust plates 43 and 44 and decreased pressures in the corresponding regions of increased clearance.

Thus the diameters of the thrust plates 43 and 44 must be of such length with respect to the regions of reduced clearance of their passages P7 that a significant restoring couple is developed before the shaft 37 is grounded due to the tilt of the rotor. Thus the thrust bearings provide a restoring couple and carry the moment load. It will be appreciated that clearance spaces have been greatly magnified throughout the drawings.

The applied force Fa causes a downward displacement of the midpoint M, as indicated by said "Rotor Axis" and "Stator Axis" reference lines, and a decrease of clearance at the closely spaced exhaust perimeters 18 and 19 of the radial bearings in the region E1 and an increase in the corresponding region E2 with the result that fluid pressure will rise in the region E1 and fall in the region E2 thus generating the restoring forces F1 and F2. It will be appreciated that said restoring forces begin to build up within the passages P1 in approaching said perimeters 18 and 19. Because the exhaust perimeters 18 and 19 are closely spaced, the tilt of the shaft makes a negligible difference in clearance space with respect to said perimeters. Hence the restoring pressure is built up or generated at the same side of the shaft 37 for both radial bearings. Consequently the restoring forces act in the same direction opposite that of the applied force Fa to establish an equilibrium therewith.

Thus in summary, the thrust bearings alone oppose the applied couple and carry the entire moment load providing a rigid shaft and the radial bearings oppose only the applied load. The term bearings in the sense used here embodies the bore, shaft and clearance space therebetween.

With reference to FIGS. 5–7, comparison is now made with externally pressurized combined radial and thrust bearing structures not embodying the structure of the invention herein. Representative of such structures will have relatively widely spaced exhaust perimeters as at the remote ends of said radial bearings.

A resolution of forces due to an applied loading similar to that shown in FIG. 4 is shown in FIG. 5 with respect to a representation of a spindle type bearing structure 60. Said structure comprises the basic structure of radial bearings 61 and 62 and a rotor 63 comprising a shaft 66 and thrust bearings 64 and 65.

In the design of conventional hydrostatic spindly bearing assemblies, such as bearing structure 60, the thrust bearings can provide no substantial resistance to tilting loads and consequently the pair of radial bearings must provide the restoring couple, that is to say, the radial bearings will bear a substantial portion if not all of the moment load. The two radial bearings 61 and 62 therefore are separated by as great a distance as space or shaft stiffness will permit in order that the negative force of the rear bearing 62 is made as small as possible.

Moments are shown taken about the center of lift of the front bearing 61. An outboard load Fa is balanced by the restoring couple R—R and the restoring force F1. Because of the wide separation of the exhaust perimeters of the two radial bearings, with the rotor tilting, the clearance will be reduced at the front bearing 61 in the direction of the applied force and at the rear bearing 62 in the direction opposite the applied force. Hence the radial bearings cannot act in the same direction in opposing the applied load and the rear bearing exerts significant negative force with respect to the restoring force generated by the front bearing. Furthermore the rotor 63 is able to tilt only through a small angle and consequently the thrust bearings 64 and 65 carried by the shaft 66 can develop only a negligible restoring couple. The front bearing 61 therefore must support the entire applied load and in addition it must support its half of the restoring couple.

Referring to FIGS. 6 and 7, these figures are intended schematically to show the series effect of force or load applied to a combined radial and thrust bearing structure for a particular explanation of the operative effect of an axial or thrust load. FIG. 6 indicates shaft displacement axially of the bearing structure, and FIG. 7 indicates a region or zone within which restoring action exerts its maximum influence and this figure shows a view taken in a plane normal to the axis of the bearing structure.

FIGS. 6 and 7 therefore represent a bearing structure 70 having thrust bearings 71, 72 carried on a shaft 75 and forming therewith a rotor 76. Said thrust bearings are in a series relationship with radial bearings 73 and 74 receiving therefrom a distributive share of the available pressure drop of the line pressure of fluid supplied. Said thrust bearings have restrictions such as steps or lands 77 and 78 about their respective perimeters.

The thrust bearing 71 is indicated by the reference arrow "Axial Load," as having a relatively large applied axial load such that the rotor is displaced toward the left in the drawing as shown, leaving a thrust clearance space which is equal to or less than the clearance space of the adacent radial bearing. A radial load is assumed applied to the shaft such that it causes a parallel displacement so that radial clearance is reduced in the region E3 and increased in the region E4. The flow of fluid reaching the clearance space of the thrust bearing passageway in the region of E'4 will be greater than that reaching the thrust clearance space of region E'3. The greater flow into the region E'4 will give rise to a greater back pressure at the region E4 than at the region E3. This greater back pressure is reflected back into the pressure distribution within the clearance space of the radial bearings.

The restoring force of the radial bearings depends upon the development of increased fluid pressures in regions of decreased clearance and decreased pressure in regions of increased clearance. The unequal annular back pressure distribution thus due to a thrust bearing in series with a radial bearing tends to cause an opposite effect and thus further diminish the load capacity of the radial bearings. The extent of this effect which may be termed "unequal flow" depends upon the ratio of the flow resistance or impedance of the radial clearance to that of the adjacent thrust bearing clearance. In the case of a lightly loaded thrust bearing having a clearance space greater than ten times the clearance of the adjacent radial bearing, the series effect of the fluid flow may be negligible and the distributive effect is also small and both may often be disregarded. In cases of substantial combined radial and thrust loading, the loss of radial bearing capacity often becomes substantial. As thrust loading is further increased, a condition will finally be reached where the flow resistance of the thrust bearing approaches that present in the radial bearing, and at this point the "unequal flow" effect will totally negative the restoring action of the radial bearing. Attempts have been made to mitigate this effect by an annular groove or chamber about the exhaust perimeter of the radial bearing in order to equalize the back pressure caused by the reduced thrust bearing clearance space. Such a groove however must contain a substantial volume relative to the flow rate of the fluid in order to be effective and in the case of compressible fluid this results in instability of the thrust bearings.

Thus with reference to FIGS. 6 and 7, with respect to bearing structure having a series flow relationship, the thrust clearance must be substantially greater than the radial clearance. As indicated in FIG. 5, under sufficient load, the angle of tilt of the shaft will reach its limits within the bore and become grounded before the thrust bearings are able to develop a restoring moment of any consequence. By comparison the structure of the invention herein with its capability of having the thrust bearings carry the moment load and the radial bearings generating effective restoring force provides a substantial improvement in structure.

MODIFICATIONS

Figure 2:
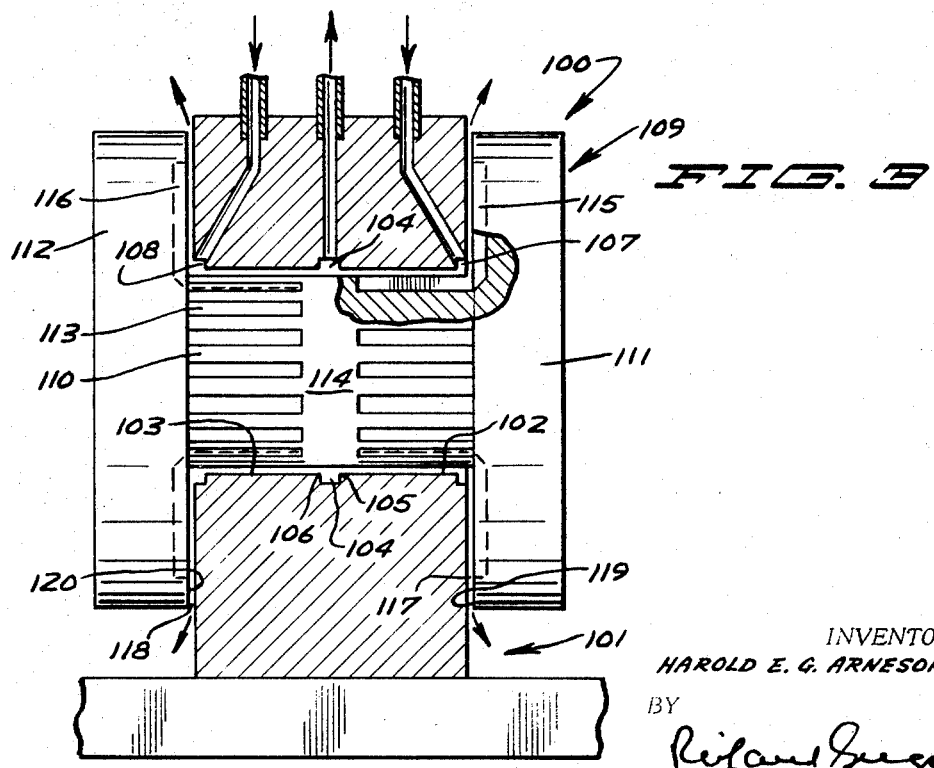

Reference is now had to additional embodiments of externally pressurized bearing structures within the scope of the invention herein, which embodiments respectively comprise the bearing structure 80 shown in FIG. 2 having restrictive tapered bearing clearance spaces and the bearing structure 100 shown in FIG. 3 having grooves forming restrictive bearing clearance spaces. These structures are shown substantially schematically for purpose of disclosure and taken with the brief description here given, and in view of the description in connection with FIG. 1 are believed to provide adequate teaching for one skilled in the art.

Said bearing 80 comprises a stator 81 forming radial bearings 82 and 83 at either side of the central exhaust passage 84 having closely spaced exhaust perimeters 85 and 86 and having supply passages 87 and 88 at the remote ends of said bearings. Journaled within said bearings is a rotor 89 comprising a shaft 90 and thrust bearings 91 and 92.

Said supply passages provide full line pressure of fluid separately to the restrictive passages 94 and 95 comprising tapered radial bearing clearance spaces and to the restrictive passages 96 and 97 comprising tapered thrust bearing clearance spaces. The thrust bearings exhaust at their perimeters as indicated by arrows.

Said bearing 100 with reference to FIG. 3, comprises a stator 101 forming radial bearings 102 and 103 at either side of the central exhaust passage 104 having closely spaced exhaust perimeters 105 and 106 and having supply passages 107 and 108 at the remote ends of said radial bearings. Journaled within said bearings is a rotor 109 comprising a shaft 110 and thrust plates or bearings 111 and 112.

The restrictive primary radial bearing clearance spaces are formed by grooves 113 spaced about said shaft at either side of a central land 114 which forms a restriction with respect to perimeters 105 and 106 of the exhaust passage 104 and which is a further restriction with respect to the clearance spaces of said grooves.

The inner faces of the thrust plates are provided with restrictive grooves 115 and 116 which exhaust through further restricted exhaust passages 117 and 118 formed by the annular lands 119 and 120 about the perimeters of said inner faces.

The length of the shafts, the bearing clearances and the size of the thrust plates of the bearing structures 80 and 100 are formed to come within the specifications of the embodiment of FIG. 1 and within the operating principles thereof.

Thus it is seen that there has been provided a simple and novel externally pressurized combined radial and thrust bearing structure arranged and constructed for full line pressure of fluid used to be supplied from common passages to both the radial and thrust bearings and in which the radial load is equal and opposite to the applied external load and the thrust bearings carry the entire moment load.

What is claimed is:

1. An externally pressurized combined radial and thrust bearing structure, comprising
 a body portion having a bore therethrough,
 said body portion forming a pair of bearings within said bore and having exhaust means between said bearings, said exhaust means having closely spaced perimeters, the adjacent ends of said bearings defining the perimeters of said exhaust means,
 means comprising supply passages adjacent each end of said bore,
 a shaft disposed within said bore spaced therefrom to form a radial passages thereabout having a restrictive radial clearance, means further restricting said radial clearance with respect to said exhaust means, a thrust plate carried at each end of said shaft and partially overlying adjacent end walls of said body portion and being spaced therefrom to form thrust passages having restrictive thrust clearance spaces therebetween, means further restricting said thrust clearance, and said supply passages communicating directly with said radial and thrust passages.

2. The structure set forth in claim 1, wherein said exhaust perimeters of said exhaust means being so closely spaced together that tilting of said shaft results in a difference of clearance with respect to said exhaust perimeters which is so negligible that both of said radial bearings develop a restoring force in the same direction, and said shaft is of a length with respect to its clearance space to be enabled to tilt through an angle which is at least one-third of the angle of tilt of said thrust plates as enabled by their respective diameters with respect to their respective clearance spaces whereby a restoring couple is developed by the thrust plates before said shaft reaches its limit of tilt.

3. The structure set forth in claim 1, wherein the diameters of said thrust plates are of such a length that the angle of tilt of said thrust plates determined by said thrust clearance is less than the angle of tilt of said shaft determined by said radial clearance.

4. The structure set forth in claim 1, wherein each of said bearings has a length at least 500 times its respective clearance.

5. The structure set forth in claim 1, wherein the diameters of said thrust plates each are greater in length than the length of said shaft.

6. An externally pressurized combined radial and thrust bearing structure, comprising a body portion having a bore therethrough, said body portion forming a pair of bearings within said bore and having exhaust means between said bearings, said exhaust means having closely spaced perimeters, the adjacent ends of said bearings define the perimeters of said exhaust means, means comprising supply passages adjacent each end of said bore, a shaft disposed within said bore and spaced therefrom to form a passage therebetween, said passage having portions respectively tapering in the direction from said means comprising said supply passages to said exhaust means, and a thrust plate carried at each end of said shaft and partially overlying adjacent end walls of said body portion and being respectively spaced therefrom to form passages therebetween, said passages respectively tapering from said means comprising said supply passages in the direction of the perimeters of said thrust plates.

7. An externally pressurized combined radial and thrust bearing structure, comprising a body portion having a bore therethrough, said body portion forming a pair of bearings within said bore and having exhaust means between said bearings, said exhaust means having closely spaced perimeters, the adjacent ends of said bearings defining the perimeters of said exhaust means, means comprising supply passages adjacent each end of said bore, a shaft disposed within said bore, said shaft and said bearings respectively having primary passages formed therebetween, said primary passages respectively comprising a plurality of longitudinal grooves circumferentially spaced about said shaft, said grooves respectively forming restrictive clearances with respect to said bearings, said shaft having an ungrooved annular portion between said primary passages providing such a restrictive clearance with respect to said exhaust passage and the adjacent end portions of said bearings as to form a further restriction of said clearance of said primary passages, a thrust plate carried at each end of said shaft and partially overlying adjacent end walls of said body portion forming passages comprising a plurality of radial grooves formed within the facing surfaces of said thrust plates and extending from said shaft to adjacent the perimeters of said thrust plates, and means further restricting said radial passages.

8. An externally pressurized combined radial and thrust bearing structure, comprising a body portion having a bore therethrough, said body portion forming a pair of bearings within said bore and having exhaust means between said bearings, means forming supply passages at each end of said bore, a shaft within said bore spaced therefrom to form a passage therebetween, said passage having a restrictive clearance, means further restricting said clearance in the direction of said exhaust means, a thrust plate carried at either end of said shaft and partially overlying the adjacent end walls of said body portion respectively forming passages therebetween having restrictive clearance therein, said thrust plates each having a diameter greater than the length of said shaft, and means further restricting said clearance within said last mentioned passages.

9. An externally pressurized combined radial and thrust bearing structure comprising a body portion having a bore therethrough, said body portion forming a pair of bearings within said bore and having exhaust means between said bearings, means forming supply passages at each end of said bore, a shaft within said bore spaced therefrom to form a passage therebetween having a restrictive clearance therein, means further restricting said clearance with reference to said exhaust means, a thrust plate carried at either end of said shaft and partially overlying the adjacent end walls of said body portion respectively forming passages therebetween having restrictive clearance therein, and means further restricting said last mentioned clearance.

References Cited

UNITED STATES PATENTS

| 1,607,318 | 11/1926 | Spillman | 308—9 |
| 1,906,716 | 5/1933 | Penick | 308—9 |
| 3,189,389 | 6/1965 | Herr | 308—12 |

MARTIN P. SCHWADRON, Primary Examiner

FRANK SUSKO, Assistant Examiner

U.S. Cl. X.R.

308—170, 172